(12) United States Patent
Maeda

(10) Patent No.: US 8,995,826 B2
(45) Date of Patent: Mar. 31, 2015

(54) IMAGE CAPTURING APPARATUS AND CONTROL METHOD OF THE IMAGE CAPTURING APPARATUS

(75) Inventor: Muneyoshi Maeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 83 days.

(21) Appl. No.: 13/208,979

(22) Filed: Aug. 12, 2011

(65) Prior Publication Data

US 2012/0051729 A1 Mar. 1, 2012

(30) Foreign Application Priority Data

Aug. 30, 2010 (JP) ................................. 2010-192705

(51) Int. Cl.
*G03B 7/00* (2014.01)
*G03B 11/00* (2006.01)
*G03B 7/20* (2006.01)

(52) U.S. Cl.
CPC . *G03B 11/00* (2013.01); *G03B 7/20* (2013.01)
USPC .............................................. 396/63; 396/64

(58) Field of Classification Search
USPC ........................................................ 396/63, 64
See application file for complete search history.

(56) References Cited

U.S. PATENT DOCUMENTS

| 4,159,864 A | * | 7/1979 | Yasukuni et al. | ............. 359/691 |
| 5,703,714 A | * | 12/1997 | Kojima | ......................... 359/368 |
| 2001/0038414 A1 | * | 11/2001 | Hofer et al. | ................... 348/207 |
| 2009/0322902 A1 | * | 12/2009 | Tengeiji et al. | ............ 348/229.1 |

FOREIGN PATENT DOCUMENTS

| JP | 08-279957 | 10/1996 |
| JP | 09-051473 | 2/1997 |
| JP | 09-186930 A | 7/1997 |
| JP | 2001-222039 A | 8/2001 |
| JP | 2007-094385 A | 4/2007 |
| JP | 2007-292828 A | 11/2007 |

OTHER PUBLICATIONS

The above references were cited in a Jun. 27, 2014 Japanese Office Action, which is enclosed without an English Translation that issued in Japanese Patent Application No. 2010-192705.

* cited by examiner

*Primary Examiner* — Clayton E LaBalle
*Assistant Examiner* — Noam Reisner
(74) *Attorney, Agent, or Firm* — Cowan, Liebowitz & Latman, P.C.

(57) ABSTRACT

An image capturing apparatus comprises: a lens unit capable of changing a focal length; an imaging unit that outputs an image signal according to light incident through the lens unit; a filter capable of moving in a direction of insertion to an optical path of the imaging unit and in a direction of retraction from the optical path; and a control unit that controls a position of the filter using information related to the focal length of the lens unit.

12 Claims, 5 Drawing Sheets

ZOOM POSITION

| F-VALUE | | 0.1 | 0.2 | 0.3 | 0.4 | 0.5 | 0.6 |
|---|---|---|---|---|---|---|---|
| | F2.0 | 300 | 310 | 320 | 330 | 340 | 350 |
| | F2.8 | 250 | 260 | 270 | 280 | 290 | 300 |
| | F4.0 | 200 | 210 | 220 | 230 | 240 | 250 |
| | F5.6 | 150 | 160 | 170 | 180 | 190 | 200 |
| | F8.0 | 100 | 110 | 120 | 130 | 140 | 150 |
| | F11.0 | 50 | 60 | 70 | 80 | 90 | 100 |

APERTURE DIAMETER BEFORE CORRECTION
APERTURE DIAMETER AFTER CORRECTION

ZOOM POSITION

| F-VALUE | 0.1 | 0.2 | 0.3 | 0.4 | 0.5 | 0.6 |
|---|---|---|---|---|---|---|
| F2.0 | 300 | 310 | 320 | 330 | 340 | 350 |
| F2.8 | 250 | 260 | 270 | 280 | 290 | 300 |
| F4.0 | 200 | 210 | 220 | 230 | 240 | 250 |
| F5.6 | 150 | 160 | 170 | 180 | 190 | 200 |
| F8.0 | 100 | 110 | 120 | 130 | 140 | 150 |
| F11.0 | 50 | 60 | 70 | 80 | 90 | 100 |

APERTURE DIAMETER BEFORE CORRECTION

APERTURE DIAMETER AFTER CORRECTION

ZOOM POSITION

|  |  | 0.1 | 0.2 | 0.3 | 0.4 | 0.5 | 0.6 |
|---|---|---|---|---|---|---|---|
| ND FILTER POSITION | RETRACT | 100 | 102 | 104 | 106 | 108 | 110 |
|  |  | 80 | 82 | 84 | 86 | 88 | 90 |
|  |  | 60 | 60 | 60 | 60 | 60 | 60 |
|  |  | 40 | 28 | 26 | 24 | 22 | 20 |
|  |  | 20 | 18 | 16 | 14 | 12 | 10 |
|  | INSERT | 0 | 0 | 0 | 0 | 0 | 0 |

ND FILTER POSITION BEFORE CORRECTION

ND FILTER POSITION AFTER CORRECTION

UNIFORM-DENSITY ND FILTER

GRADATIONAL ND FILTER

IMAGE CAPTURING APPARATUS AND CONTROL METHOD OF THE IMAGE CAPTURING APPARATUS

BACKGROUND OF THE INVENTION

1. Field of the Invention

The present invention relates to an image capturing apparatus and a control method of the image capturing apparatus, and more particularly, to an image capturing apparatus that uses an ND filter to control exposure and that has a zoom function and a control method of the image capturing apparatus.

2. Description of the Related Art

Conventionally, a lens related to zoom magnification control or a group including the lens in a lens unit is controlled back and forth to change and control the zoom magnification in an image capturing apparatus, such as a digital still camera and a digital video camera, with a zoom function. However, a change in the zoom magnification usually changes the focal length, which causes a change in the minimum f-number due to attenuation of the quantity of incident light, and the exposure is changed. For example, if the zoom magnification is controlled to the maximum (telephoto end) when the specification of the lens is "F1.8 to F2.8", the quantity of incident light is attenuated even if the aperture diameter of the diaphragm is open, i.e. opened to the maximum extent. As a result, the exposure is reduced, and the minimum f-number increases. Under such a specification, the minimum f-number cannot be set to F1.8 even if the aperture diameter of the diaphragm is open, and the minimum f-number increases to F2.8 at the maximum as a result of the exposure change due to the change in the zoom magnification.

In zoom lenses of many image capturing apparatuses, a group of lenses arranged in front of the diaphragm (group closer to the subject than the diaphragm) is moved back and forth over the optical axis to control the zoom magnification. Therefore, if the diaphragm is controlled to the aperture diameter with an f-number greater than the minimum f-number (for example, F2.8 in the example of specification described above) in which the zoom magnification is determined at the telephoto end, the zoom can be operated while keeping the f-number constant. More specifically, the exposure can be maintained at an aperture diameter of the diaphragm corresponding to the f-number greater than the minimum f-number at the telephoto end even if the zoom magnification is changed. However, the f-number is changed by the zoom magnification at an aperture diameter greater than the aperture diameter of the diaphragm corresponding to the minimum f-number determined at the telephoto end even if the aperture diameter of the diaphragm is the same.

Meanwhile, demand for miniaturization and wider angle of the image capturing apparatus is increasing, and there can be a zoom lens that controls the zoom by controlling not only the group of lenses arranged in front of the diaphragm, but also a group of lenses arranged on the back (group closer to the image capturing apparatus than the diaphragm), back and forth over the optical axis. Unlike the control of only the group in front of the diaphragm, the focal length on the back of the diaphragm changes relative to the aperture diameter of the diaphragm when such a zoom lens is used. Therefore, there is a problem that the f-number changes in accordance with the zoom magnification throughout the entire aperture diameter of the diaphragm.

Consequently, a first method is proposed, which is a method of correcting the f-number and keeping the exposure by controlling the size of the aperture diameter of the diaphragm as for the change in the f-number relative to the change in the focal length caused by the zoom control. For example, there is a proposed method which provides a table, in which the size of the aperture diameter of the diaphragm relative to the f-number is defined for each focal length that can be resulted from the zoom control of the zoom lens, and the table is used for the correction. In the zoom control of this method, the size of the aperture diameter of the diaphragm defined in the table is calculated based on the zoom magnification and the current f-number, and then the diaphragm is controlled to the calculated aperture diameter to enable the zoom control while maintaining the exposure (for example, see Japanese Patent Laid-Open No. 8-279957).

A second method is proposed, which is a method using a gain circuit, an electronic shutter circuit, etc. In the zoom control of this method, the gain circuit performs the correction based on a gain value so as to cancel the exposure change in accordance with the change in the focal length caused by the zoom control. Similarly, the electronic shutter circuit controls the accumulation of the image sensor to compensate the exposure change (for example, see Japanese Patent Laid-Open No. 9-51473).

However, when the first method is applied to the conventional image capturing apparatus using the ND filter, the state of the area, position, density, etc., of the ND filter that covers the aperture diameter may change as shown in FIGS. 5A and 5B. Particularly, the state may change when an ND filter with gradationally changing transmittance or density is used or when the ND filter partially, not completely, covers the aperture diameter. In that case, the exposure change caused by the change in the state of the ND filter is prominent.

In the second method, the exposure change caused by the change in the focal length is corrected without controlling the size of the aperture diameter of the diaphragm, and the state of the area, position, density, etc., of the ND filter covering the aperture diameter does not change unlike the first method. Therefore, the exposure is not changed by the ND filter. However, when the gain circuit is used, electrical correction is performed by enlarging the gain value for the exposure change, and a noise is generated in the captured image. When the electronic shutter circuit is used, the shutter speed may be slowed down by the correction to the slow shutter speed, in which case the motion resolution is reduced. Therefore, it is difficult to obtain an excellent image.

SUMMARY OF THE INVENTION

The present invention has been made in consideration of the above situation, and the change in the exposure is suppressed before and after the change in the focal length in an image capturing apparatus that controls the size of the aperture diameter of the diaphragm in accordance with the change in the focal length and that uses an ND filter.

According to the present invention, provided is an image capturing apparatus comprising: a lens unit capable of changing a focal length; an imaging unit that outputs an image signal according to light incident through the lens unit; a filter capable of moving in a direction of insertion to an optical path of the imaging unit and in a direction of retraction from the optical path; and a control unit that controls a position of the filter using information related to the focal length of the lens unit.

According to the present invention, provided is a control method of an image capturing apparatus, the image capturing apparatus comprising: a lens unit capable of changing a focal length; an imaging unit that outputs an image signal according to light incident through the lens unit; and a filter capable of moving in a direction of insertion to an optical path of the imaging unit and in a direction of retraction from the optical path, the control method comprising a control step of controlling a position of the filter using information related to the focal length of the lens unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings.

Figure 1:
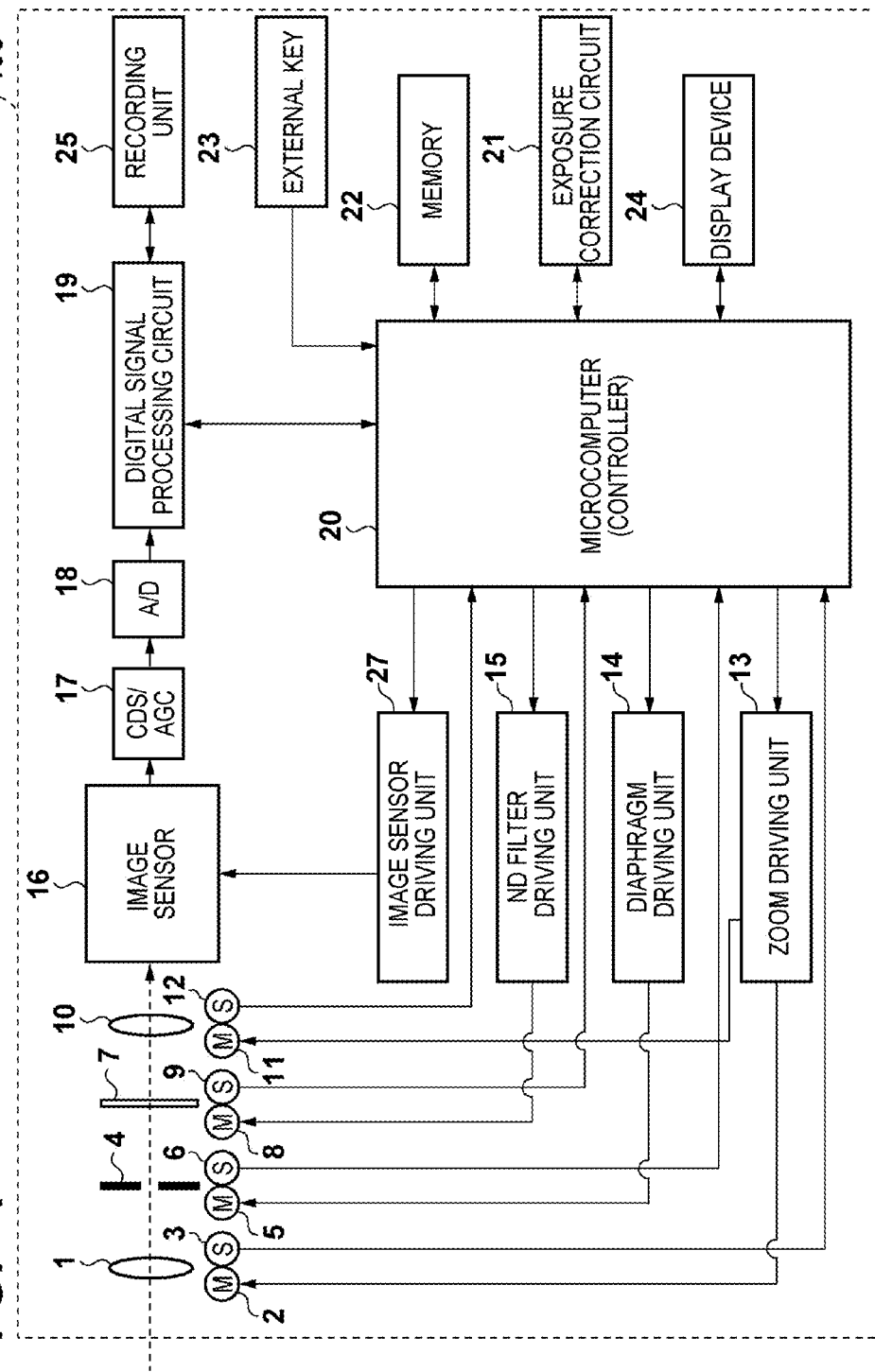
FIG. 1 is a block diagram showing an example of a schematic configuration of an image capturing apparatus according to an embodiment of the present invention.

FIG. 1 is a block diagram showing an example of a schematic configuration of an image capturing apparatus 100 according to an embodiment of the present invention. The image capturing apparatus 100 includes a digital still camera and a digital video camera, for example.

In FIG. 1, reference numeral 1 denotes a first lens group positioned closer to a subject relative to a diaphragm 4, and reference numeral 10 denotes a second lens group disposed closer to an image sensor 16 (closer to the main body of the image capturing apparatus) relative to the diaphragm 4. More specifically, light before passing through the aperture of the diaphragm 4 is incident on the first lens group 1, and light after passing through the aperture of the diaphragm 4 is incident on the second lens group. The first lens group 1 and the second lens group 10 are controlled back and forth over the optical axis to control the zoom. Although one lens is illustrated for each of the first lens group 1 and the second lens group 10, in FIG. 1 for the simplification, each of the first lens group 1 and the second lens group 10 usually includes a plurality of lenses. The first lens group 1 and the second lens group 10 may have functions of focus control and anti-vibration control in addition to the zoom control. Each of the first lens group 1 and the second lens group 10 may be constituted by one lens, and the term "lens group" is used in the present embodiment even if only one lens is included. In the present embodiment, a unit including the first lens group 1 and the second lens group 10 is called a "lens unit".

A lens driving motor 2 drives the first lens group 1 back and forth over the optical axis according to driving power supplied from a zoom driving unit 13. Similarly, a lens driving motor 11 drives the second lens group 10 back and forth over the optical axis according to driving power supplied from the zoom driving unit 13. A lens state detection circuit 3 detects the drive state of the first lens group 1 and outputs the detected result to a microcomputer 20. Similarly, a lens state detection circuit 12 detects the drive state of the second lens group 10 and outputs the detected result to the microcomputer 20.

An example of the diaphragm 4 includes diaphragm blades that adjust the quantity of light entering the image capturing apparatus 100 from the outside. A diaphragm driving motor 5 drives the diaphragm 4 according to driving power supplied by a diaphragm driving unit 14. A diaphragm state detection circuit 6 detects the drive state of the diaphragm 4 and outputs the detected result to the microcomputer 20. The diaphragm driving motor 5 and the diaphragm state detection circuit 6 control the diaphragm 4 to set the aperture diameter of the diaphragm as calculated by the microcomputer 20 when the focal length is changed by the movement of the first lens group 1 and the second lens group 10.

An ND (Neutral Density) filter 7 can be inserted and retracted to and from an optical path to the image sensor 16 (can be moved in a direction of insertion to the optical path to the image sensor 16 and in a direction of retraction from the optical path to the image sensor 16), and the light passed through the first lens group 1 is reduced by inserting the ND filter 7. An ND filter driving motor 8 drives the ND filter 7 according to driving power supplied by an ND filter driving unit 15. An ND filter drive detection circuit 9 detects the drive state of the ND filter 7 and outputs the detected result to the microcomputer 20. As described below, when the aperture diameter is changed as the diaphragm 4 is corrected, the microcomputer 20 calculates the position of the ND filter 7 based on the outputted detection result, and the ND filter driving motor 8 and the ND filter drive detection circuit 9 control the ND filter 7 to keep the same exposure. Although an ND filter in which the transmittance or the density gradationally changes (the light transmittance is lower at the end in the direction of retraction from the optical path than at the end in the direction of insertion to the optical path) is described as an example of the ND filter 7 in the present embodiment, an ND filter with uniform density in which the light transmittance is substantially constant may also be used. Although one ND filter is illustrated in FIG. 1 for the simplification, the ND filter 7 may include a plurality of ND filters.

The examples of the image sensor 16 includes a CMOS image sensor and a CCD image sensor. The image sensor 16 photoelectrically converts an optical image of the subject incident on the image sensor 16 through from the first lens group 1 to the second lens group 10 and accumulates the obtained charge. The charge (image signal) accumulated on each pixel of the image sensor 16 is outputted to a CDS/AGC circuit 17 according to a driving pulse of an image sensor driving unit 27 described later. The CDS/AGC circuit 17 samples and amplifies the outputted image signal. Correlated double sampling (CDS) is performed in the sampling, and auto gain control (AGC) is performed in the amplification. An A/D converter 18 converts an image signal (analog signal) processed by the CDS/AGC circuit 17 into a digital image signal. A digital signal processing circuit 19 applies various signal processes to the digital image signal outputted from the A/D converter 18.

A recording unit 25 writes out an image generated by the digital signal processing circuit 19 to an external memory, such as a memory card.

The microcomputer 20 is a circuit called a microcontroller or, simply, a controller. The microcomputer 20 comprehensively controls the operation of the image capturing apparatus 100. For example, the microcomputer 20 receives information of luminance, color, etc., from the digital signal processing circuit 19 to perform various arithmetic processes.

An example of the controls performed by the microcomputer 20 includes the following control for appropriately adjusting the quantity of light of the subject image incident on the image sensor 16. Exposure values including parameters of the diaphragm 4, the ND filter 7, etc., for appropriate exposure are first determined from a photometric value (luminance value) of the captured image. The diaphragm driving unit 14 and the ND filter driving unit 15 drive and control the diaphragm 4 and the ND filter 7 based on the calculation result. Although the diaphragm 4 and the ND filter 7 are subjected to automatic exposure (AE) control in the example illustrated in the present embodiment, the user may be able to perform manual operations.

The microcomputer 20 drives the first lens group 1 and the second lens group 10 to set the zoom magnification instructed by the user from an external key 23 described later. When a change of the zoom magnification is instructed from the external key 23, the microcomputer 20 adjusts the diaphragm 4 and the ND filter 7 based on a correction value that is calculated by an exposure correction circuit 21 and that is for adjusting the aperture diameter of the diaphragm 4 and the position of the ND filter 7 to maintain the state of exposure. Details of the control by the exposure correction circuit 21 and the microcomputer 20 when the zoom magnification is changed will be described later.

The diaphragm driving unit 14 supplies driving power to the diaphragm driving motor 5 based on the control by the microcomputer 20. For example, the diaphragm driving unit 14 supplies driving power for closing or opening the diaphragm 4 based on control derived from an exposure value calculated by the microcomputer 20 in accordance with a photometric value (luminance value) of the image captured by the image sensor 16. As a result, the image capturing apparatus 100 can adjust the diaphragm so that an appropriate quantity of light is incident on the image sensor 16. A photometric sensor may be separately arranged, and a photometric value obtained from the photometric sensor may be used to control the diaphragm 4.

The ND filter driving unit 15 supplies driving power to the ND filter driving motor 8 based on the control by the microcomputer 20. For example, the ND filter driving unit 15 supplies driving power for changing the insertion position of the ND filter 7 based on control derived from the exposure value calculated by the microcomputer 20 in accordance with the photometric value (luminance value) of the image captured by the image sensor 16. As a result, the image capturing apparatus can adjust the quantity of light incident on the image sensor 16 in accordance with the photometric value of the photographed image.

The image sensor driving unit 27 supplies a driving pulse, etc., for driving the image sensor 16 to the image sensor 16 based on the control by the microcomputer 20, thereby reading out an image captured by the image sensor 16 and adjusting the exposure time. For example, the image sensor driving unit 27 supplies a driving pulse for the exposure of the image sensor 16 at a predetermined exposure period of time based on the control of the microcomputer 20 in accordance with the photometric value of the image captured by the image sensor 16. As a result, the image capturing apparatus 100 can adjust the exposure period of time of the image sensor 16 in accordance with the photometric value of the captured image and read out the image.

A memory 22 is a RAM (Random Access Memory), etc., and temporarily stores data. For example, the memory 22 temporarily stores image data, etc., captured by the image sensor 16 and processed by the digital signal processing circuit 19. Programs for driving the image capturing apparatus 100 are also stored in the memory 22, and the microcomputer 20 sequentially invokes and executes the programs. The memory 22 stores correction position data when correction positions of the diaphragm 4 and the ND filter 7 based on a simulation are used in advance.

The external key 23 is used to change the zoom magnification of the image capturing apparatus 100 and perform various settings. In this case, icons and messages are displayed on a display device 24 to notify the user of the operations of the external key.

Figure 2:
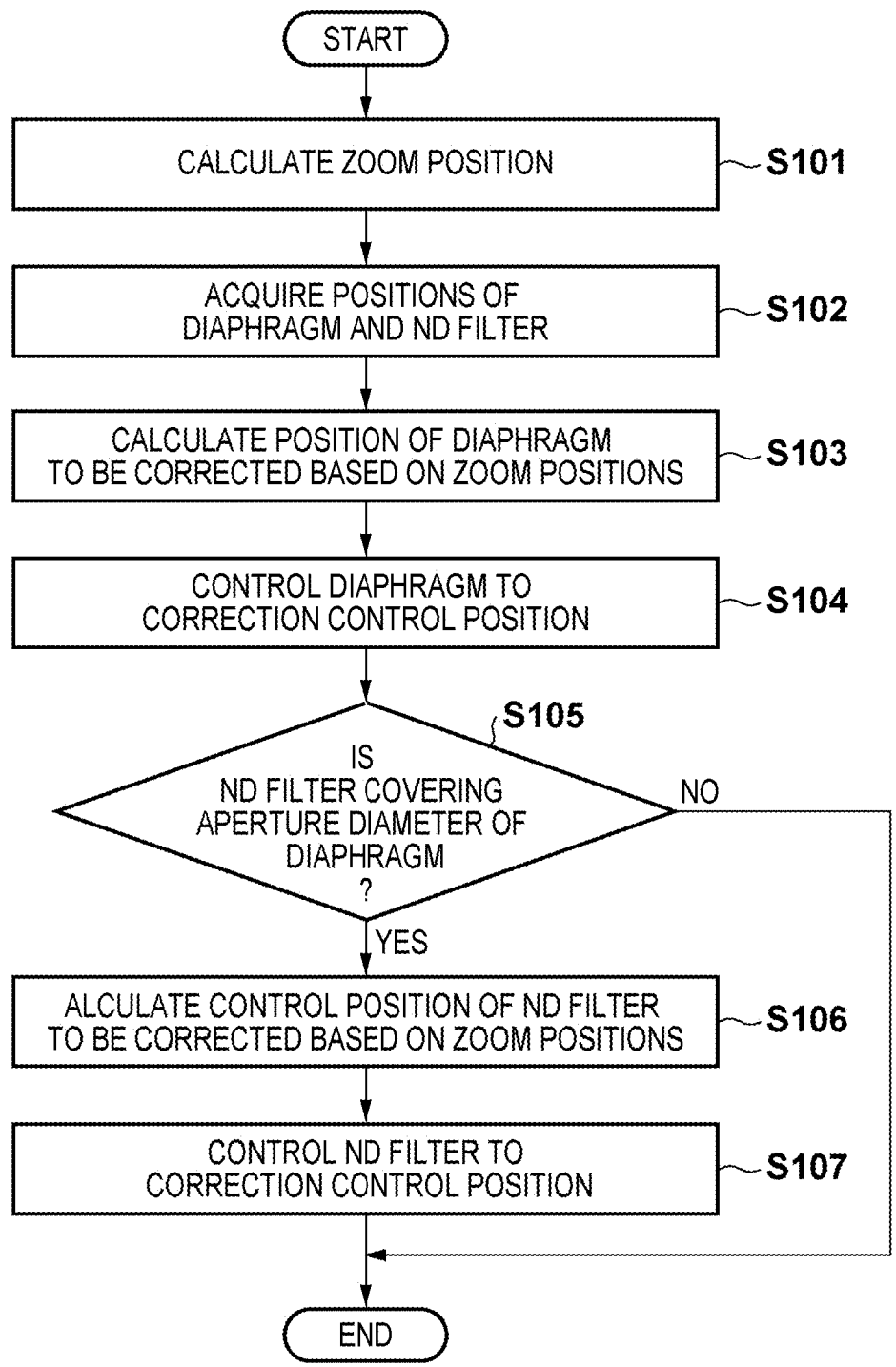
FIG. 2 is a flow chart showing a control method of the image capturing apparatus according to the embodiment of the present invention.

A control method performed by the exposure correction circuit 21 and the microcomputer 20 when the zoom magnification is changed will be described with reference to the flow chart of FIG. 2. The process shown in FIG. 2 is executed at a predetermined period shorter than normal AE when a change of the zoom magnification is instructed by the external key 23.

In step S101, the microcomputer 20 acquires control positions of the first lens group 1 and the second lens group 10 detected by the lens state detection circuits 3 and 12 to calculate the zoom position and transmits information (information related to the focal length) indicating the calculated zoom position to the exposure correction circuit 21.

In step S102, the microcomputer 20 acquires the control position of the diaphragm 4 detected by the diaphragm state detection circuit 6 and transmits information indicating the acquired control position to the exposure correction circuit 21. The microcomputer 20 acquires the control position of the ND filter 7 detected by the ND filter drive detection circuit 9 and transmits information indicating the acquired control position to the exposure correction circuit 21.

In step S103, the exposure correction circuit 21 calculates the control position of the diaphragm 4 for maintaining the exposure based on the zoom position acquired in step S101 and the zoom position before the change in the zoom magnification (namely, zoom lens positions before and after the change) as well as the control position of the diaphragm 4 acquired in step S102. The calculated control position is outputted to the microcomputer 20. Although the exposure correction circuit 21 may calculate the control position every time the zoom magnification is changed, the control position is calculated here using a diaphragm correction table, which describes control positions of the diaphragm to be changed based on the zoom position calculated in step S101 and the control position of the diaphragm 4 calculated in step S102, to increase the execution speed. In this way, the aperture diameter of the diaphragm 4 after the change in the zoom magnification is made smaller or larger than before the change in the zoom magnification to compensate the amount of exposure change caused by the change in the zoom magnification.

Figures 3A, 3B:
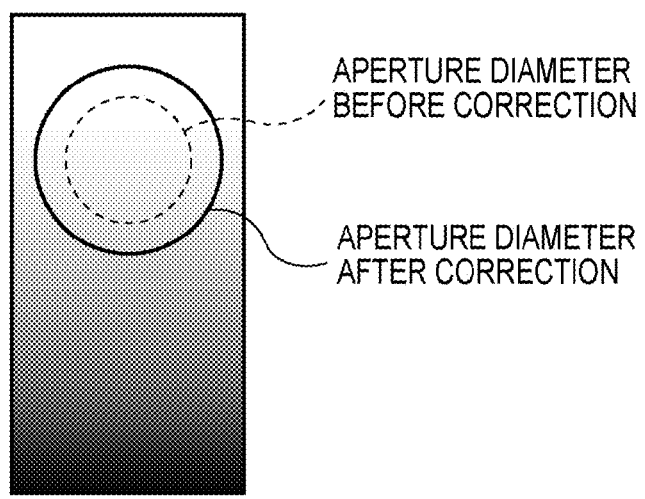
FIGS. 3A and 3B are diagrams showing examples of a diaphragm correction table and an aperture diameter before and after correction according to the embodiment of the present invention.

FIG. 3A shows an example of such a diaphragm correction table. In FIG. 3A, "ZOOM POSITION" indicates values normalized by setting the telephoto end as 1× and setting the wide end as 0×. The numbers in the table indicate values of an encoder provided to the diaphragm driving unit 14. The values of the zoom position in FIG. 3A are values calculated based on the zoom positions of the first lens group 1 and the second lens group 10. The focal length of the image capturing apparatus 100 increases toward the telephoto end, and the focal length decreases toward the wide end. In the example, the narrower the aperture diameter of the diaphragm 4 is, the smaller the value of the encoder is, and the wider the aperture diameter is, the larger the value is. For example, if the zoom position has changed from 0.1 to 0.4 and the current control position of the diaphragm 4 is 200 at the value of the encoder, 230 is the control position after the correction. More specifically, the aperture diameter of the diaphragm 4 needs to be enlarged in accordance with the change in the zoom position to the telephoto side. FIG. 3B is a diagram showing the change in the aperture diameter of the diaphragm 4 in this case, and the dotted line shows the control position before the change. The diaphragm correction table of FIG. 3A describes control positions of the diaphragm relative to the zoom position calculated from the result of simulation. The values are examples, and values indicating the control positions of the diaphragm relative to the zoom position need to be held. The diaphragm correction table is stored in the memory 22, and to use the table, the exposure correction circuit 21 can read out the table through the microcomputer 20. The diaphragm correction table may be stored not only in the memory 22, but also in another memory accessible by the microcomputer 20, such as in a memory (not shown) in the microcomputer 20.

In step S104, the diaphragm 4 is driven to the control position of the diaphragm calculated in step S103. In this case, the diaphragm driving unit 14 drives the diaphragm driving motor 5 based on a command of the microcomputer 20 to drive the diaphragm 4.

In step S105, the exposure correction circuit 21 determines whether correction and control of the position of the ND filter 7 is necessary to maintain the exposure based on the control position of the diaphragm controlled in step S104 and the position of the ND filter 7 acquired in step S102. In this case, whether the ND filter 7 covers at least part of the aperture diameter of the diaphragm 4 after the correction and control in step S104 is determined, and the process proceeds to step S106 if it is determined that the ND filter 7 covers the aperture diameter of the diaphragm 4. On the other hand, the process ends if it is determined that the ND filter 7 does not cover the aperture diameter of the diaphragm 4.

Figures 4A, 4B:
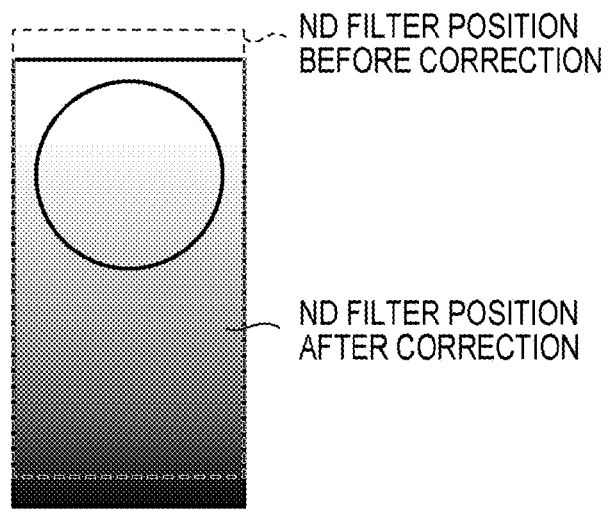
FIGS. 4A and 4B are diagrams showing examples of an ND filter correction table and positions of an ND filter before and after correction according to the embodiment of the present invention.

In step S106, the exposure correction circuit 21 calculates the control position of the ND filter 7 for maintaining the exposure based on the zoom position acquired in step S101 and the zoom position before the change as well as the control position of the ND filter 7 acquired in step S102. The calculated control position is outputted to the microcomputer 20. Although the exposure correction circuit 21 may calculate the control position every time the zoom magnification is changed, the control position is calculated using an ND filter correction table, which describes control positions of the ND filter 7 based on the zoom position calculated in step S101 and the position of the ND filter 7 calculated in step S102, to increase the execution speed. FIG. 4A shows an example of the ND filter correction table used here. In FIG. 4A, "ZOOM POSITION" indicates values normalized by setting the telephoto end as 1× and setting the wide end as 0×. The numbers in the table indicate values of an encoder provided to the ND filter driving unit 15. The values of the zoom position in FIG. 4A are values calculated based on the zoom positions of the first lens group 1 and the second lens group 10. In the example, the value when the ND filter 7 is completely inserted is 0, and the value increases as the zoom position moves in the direction of retraction. For example, if the zoom position has changed from 0.1 to 0.4 and the current control position of the ND filter 7 is 80 at the value of the encoder, 86 is the control position. More specifically, the ND filter 7 needs to be moved toward the retracted position in accordance with the change in the zoom position to the telephoto side. This is because as a result of the enlargement of the aperture diameter of the diaphragm 4 in accordance with the change in the zoom position, more part with low transmittance of the ND filter 7 covers the aperture diameter compared to before the change in the zoom position. In such a state, the quantity of light incident on the image sensor 16 is reduced more than necessary. Therefore, the movement of the ND filter 7 toward the retracted position as described above causes about the same size of the part with low transmittance of the ND filter 7 to cover the aperture diameter compared to before the change in the zoom position. The change in the quantity of light incident on the image sensor 16 before and after the change in the focal length can be suppressed by changing the position of the ND filter 7 before and after the change in the focal length.

FIG. 4B is a diagram showing the change in the ND filter 7 at this time, and the dotted line shows the control position before the change.

If the zoom position has changed from 0.1 to 0.4, and the current control position of the ND filter 7 is 20 at the value of the encoder, 14 is the control position. In this case, the ND filter 7 needs to be moved toward the insertion position in accordance with the change in the zoom position to the telephoto side. This is because as a result of the enlargement of the aperture diameter of the diaphragm 4 in accordance with the change in the zoom position, more part with high transmittance of the ND filter 7 covers the aperture diameter compared to before the change in the zoom position. In such a state, the quantity of light incident on the image sensor 16 is transmitted more than necessary. Therefore, the ND filter 7 is moved toward the insertion position as described above to cause about the same size of the part with low transmittance of the ND filter 7 to cover the aperture diameter compared to before the change in the zoom position.

If the current control position of the ND filter 7 is 60 at the value of the encoder, 60 is the control position at any zoom position. In this case, the ND filter 7 does not have to be moved even if the zoom position is changed. This is because the reduction of the light passing through the aperture diameter does not change even if the aperture diameter of the diaphragm 4 is enlarged in accordance with the change in the zoom position.

As described, even if there is a similar zoom change (change in the focal length), whether to move the ND filter 7 toward the insertion position or toward the retracted position varies depending on the insertion position of the ND filter 7 before the zoom change. More specifically, the direction of moving the ND filter 7 in accordance with the zoom change varies depending on whether the insertion position of the ND filter 7 before the zoom change is closer to the insertion position or closer to the retracted position relative to a predetermined position.

Even if the insertion position of the ND filter 7 is the same, the direction of moving the position of the ND filter 7 varies depending on the type of the zoom change (whether to change the zoom to increase the focal length or to reduce the focal length).

The ND filter correction table of FIG. 4A describes control positions of the ND filter 7 relative to the zoom positions calculated from the result of simulation.

Figure 5A:
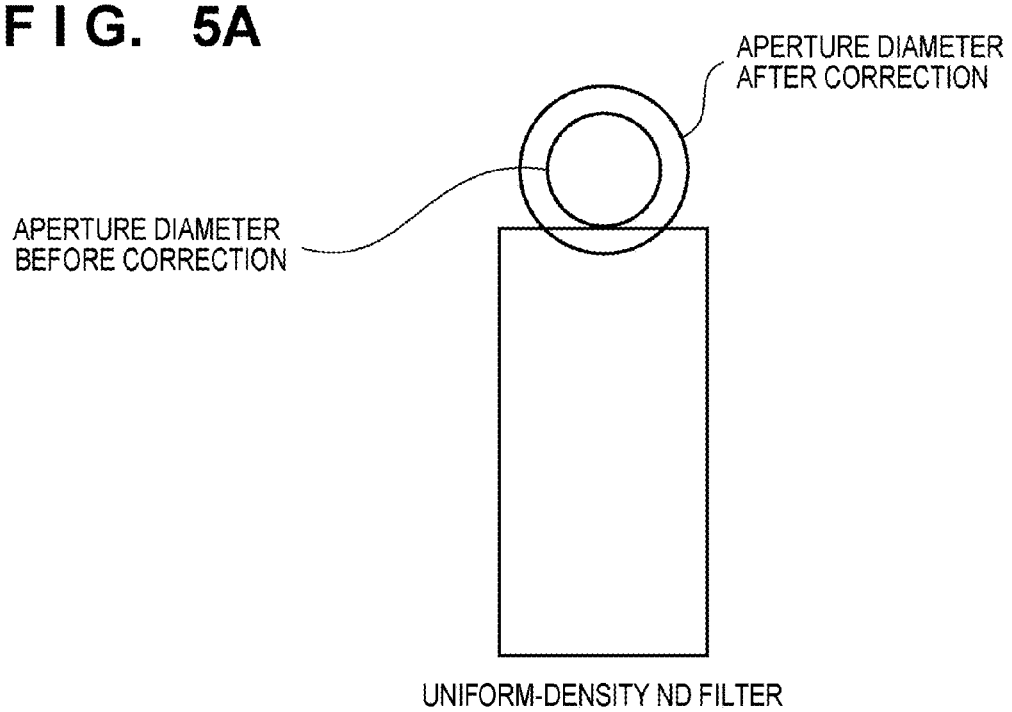
FIGS. 5A and 5B are diagrams for explaining relationships between a change in the aperture diameter of a diaphragm associated with a change in the focal length and an ND filter position.
Figure 5B:
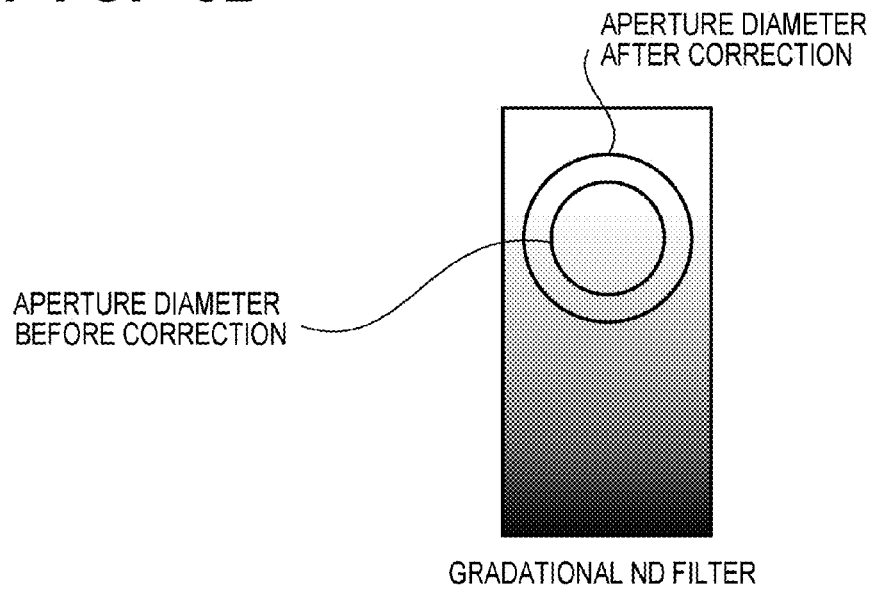

The reason that the ND filter correction table does not include the factor of the diaphragm here is that the ND filter 7 and the diaphragm 4 are not controlled at the same time in the control of FIG. 2. It should be noted that the values illustrated in FIG. 4A are examples, and values indicating the control positions of the ND filter relative to the zoom positions need to be held. For example, the present embodiments describe a case in which the ND filter 7 is a gradational ND filter. Meanwhile, if the ND filter 7 is a uniform-density ND filter, values indicating the control positions to completely cover the entire aperture diameter by the ND filter 7, or completely retract the ND filter 7 from the aperture diameter can be held so as to avoid a situation in which the aperture diameter of the diaphragm is only partially covered as shown in FIG. 5A.

The ND filter correction table is stored in the memory 22, and to use the table, the exposure correction circuit 21 can read out the table through the microcomputer 20. The ND filter correction table may be stored not only in the memory 22, but also in another memory accessible by the microcomputer 20, such as in a memory (not shown) in the microcomputer 20.

Lastly, in step S107, the ND filter 7 is driven to the control position of the ND filter calculated in step S106. In this case, the ND filter driving unit 15 drives the ND filter driving motor 8 based on a command of the microcomputer 20 to drive the ND filter 7.

The ND filter position control allows keeping the exposure before and after the change in the focal length without a change in the exposure due to a change in the state of the area, position, density, etc., of the ND filter covering the aperture diameter in response to a change in the aperture diameter of the diaphragm associated with a change in the zoom position.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, although the circuit units are all independent in the configurations of the present embodiments as shown in FIG. 1, all or part of the configurations may be included in the microcomputer 20. Further, although the exposure correction circuit 21 and the microcomputer 20 execute the process shown in FIG. 2 in the description, the configuration of the exposure correction circuit 21 may be included in the microcomputer 20, and the microcomputer 20 may execute the entire process of FIG. 2.

This application claims the benefit of Japanese Patent Application No. 2010-192705, filed on Aug. 30, 2010 which is hereby incorporated by reference herein in its entirety.

What is claimed is:

1. An image capturing apparatus comprising:
a lens unit that has a plurality of lenses, the lens unit being capable of changing a focal length by moving at least one of the plurality of lenses;
a diaphragm that is disposed between the plurality of lenses included in said lens unit;
an imaging unit that outputs an image signal according to light incident through said lens unit;
a filter that adjusts a quantity of light which has passed through the one of the plurality of lenses to change the focal length and is capable of moving in a direction of insertion to an optical path of the light toward said imaging unit and in a direction of retraction from the optical path; and
a control unit that controls an aperture diameter of said diaphragm and a position of said filter,
wherein, when the focal length of said lens unit is changed, the control unit controls the aperture diameter of said diaphragm and the position of said filter based on information related to a changed focal length of said lens unit,
wherein said control unit changes the aperture diameter of said diaphragm so that the aperture diameters are different before and after the change in the focal length of said lens unit, and controls the position of said filter according to a change in the aperture diameter of said diaphragm, and
wherein said control unit changes the direction of moving the position of said filter along with the change in the focal length of said lens unit according to the position of said filter before the change in the focal length of said lens unit.

2. An image capturing apparatus comprising:
a lens unit that has a plurality of lenses, the lens unit being capable of changing a focal length by moving at least one of the plurality of lenses;
a diaphragm that is disposed between the plurality of lenses included in said lens unit;
an imaging unit that outputs an image signal according to light incident through said lens unit;
a filter that adjusts a quantity of light which has passed through the one of the plurality of lenses to change the focal length and is capable of moving in a direction of insertion to an optical path of the light toward said imaging unit and in a direction of retraction from the optical path; and
a control unit that controls an aperture diameter of said diaphragm and a position of said filter,
wherein, when the focal length of said lens unit is changed, the control unit controls the aperture diameter of said diaphragm and the position of said filter based on information related to a changed focal length of said lens unit,
wherein said control unit changes the aperture diameter of said diaphragm so that the aperture diameters are different before and after the change in the focal length of said lens unit, and controls the position of said filter according to a change in the aperture diameter of said diaphragm, and
wherein said control unit changes the position of said filter so that said filter is at different positions before and after the change in the focal length of said lens unit and changes the direction of moving the position of said filter between when the position is changed to increase the focal length of said lens unit and when the position is changed to reduce the focal length of said lens unit.

3. An image capturing apparatus comprising:
a lens unit that has a plurality of lenses, the lens unit being capable of changing a focal length by moving at least one of the plurality of lenses;
a diaphragm that is disposed between the plurality of lenses included in said lens unit;
an imaging unit that outputs an image signal according to light incident through said lens unit;
a filter that adjusts a quantity of light which has passed through the one of the plurality of lenses to change the focal length and is capable of moving in a direction of insertion to an optical path of the light toward said imaging unit and in a direction of retraction from the optical path; and
a control unit that controls an aperture diameter of said diaphragm and a position of said filter,
wherein, when the focal length of said lens unit is changed, the control unit controls the aperture diameter of said diaphragm and the position of said filter based on information related to a changed focal length of said lens unit,
wherein said control unit changes the aperture diameter of said diaphragm so that the aperture diameters are different before and after the change in the focal length of said lens unit, and controls the position of said filter according to a change in the aperture diameter of said diaphragm, wherein said control unit controls the position of said filter to suppress a change in a quantity of light incident on said imaging unit before and after the change in the focal length of said lens unit, and wherein said control unit changes the aperture diameter of said diaphragm so that the aperture diameters are different before and after the change in the focal length of said lens unit, and controls the position of said filter to suppress a change in the quantity of light incident on said image unit caused by the change in the aperture diameter of said diaphragm.

4. An image capturing apparatus comprising:
a lens unit that has a plurality of lenses, the lens unit being capable of changing a focal length by moving at least one of the plurality of lenses;
a diaphragm that is disposed between the plurality of lenses included in said lens unit;
an imaging unit that outputs an image signal according to light incident through said lens unit;
a filter that adjusts a quantity of light which has passed through the one of the plurality of lenses to change the focal length and is capable of moving in a direction of insertion to an optical path of the light toward said imaging unit and in a direction of retraction from the optical path; and
a control unit that controls an aperture diameter of said diaphragm and a position of said filter in conjunction with the change in the focal length of said lens unit so as to maintain a quantity of light incident on said imaging unit before and after the change in focal length,
wherein said control unit changes the direction of moving the position of said filter along with the change in the focal length of said lens unit according to the position of said filter before the change in the focal length of said lens unit.

5. An image capturing apparatus comprising:
a lens unit that has a plurality of lenses, the lens unit being capable of changing a focal length by moving at least one of the plurality of lenses;
a diaphragm that is disposed between the plurality of lenses included in said lens unit;
an imaging unit that outputs an image signal according to light incident through said lens unit;
a filter that adjusts a quantity of light which has passed through the one of the plurality of lenses to change the focal length and is capable of moving in a direction of insertion to an optical path of the light toward said imaging unit and in a direction of retraction from the optical path; and
a control unit that controls an aperture diameter of said diaphragm and a position of said filter in conjunction with the change in the focal length of said lens unit so as to maintain a quantity of light incident on said imaging unit before and after the change in focal length,
wherein said control unit changes the position of said filter so that said filter is at different positions before and after the change in the focal length of said lens unit and changes the direction of moving the position of said filter between when the position is changed to increase the focal length of said lens unit and when the position is changed to reduce the focal length of said lens unit.

6. An image capturing apparatus comprising:
a lens unit that has a plurality of lenses, the lens unit being capable of changing a focal length by moving at least one of the plurality of lenses;
a diaphragm that is disposed between the plurality of lenses included in said lens unit;
an imaging unit that outputs an image signal according to light incident through said lens unit;
a filter that adjusts a quantity of light which has passed through the one of the plurality of lenses to change the focal length and is capable of moving in a direction of insertion to an optical path of the light toward said imaging unit and in a direction of retraction from the optical path; and
a control unit that controls an aperture diameter of said diaphragm and a position of said filter in conjunction with the change in the focal length of said lens unit so as to maintain a quantity of light incident on said imaging unit before and after the change in focal length,
wherein said control unit changes the aperture diameter of said diaphragm so that the aperture diameters are different before and after the change in the focal length of said lens unit, and controls the position of said filter to suppress a change in the quantity of light incident on said image unit caused by the change in the aperture diameter of said diaphragm.

7. A control method of an image capturing apparatus, the image capturing apparatus comprising: a lens unit that has a plurality of lenses, the lens unit being capable of changing a focal length by moving at least one of the plurality of lenses; a diaphragm that is disposed between the plurality of lenses included in said lens unit; an imaging unit that outputs an image signal according to light incident through said lens unit; and a filter that adjusts a quantity of light which has passed through the one of the plurality of lenses to change the focal length and is capable of moving in a direction of insertion to an optical path of the light toward said imaging unit and in a direction of retraction from the optical path, the control method comprising:
a control step of controlling an aperture diameter of said diaphragm and a position of said filter in conjunction with the change in the focal length of said lens unit so as to maintain a quantity of light incident on said imaging unit before and after the change in focal length,
wherein the control step changes the direction of moving the position of said filter along with the change in the focal length of said lens unit according to the position of said filter before the change in the focal length of said lens unit.

8. A control method of an image capturing apparatus, the image capturing apparatus comprising: a lens unit that has a plurality of lenses, the lens unit being capable of changing a focal length by moving at least one of the plurality of lenses; a diaphragm that is disposed between the plurality of lenses included in said lens unit; an imaging unit that outputs an image signal according to light incident through said lens unit; and a filter that adjusts a quantity of light which has passed through the one of the plurality of lenses to change the focal length and is capable of moving in a direction of insertion to an optical path of the light toward said imaging unit and in a direction of retraction from the optical path, the control method comprising:
a control step of controlling an aperture diameter of said diaphragm and a position of said filter in conjunction with the change in the focal length of said lens unit so as to maintain a quantity of light incident on said imaging unit before and after the change in focal length, wherein said control step changes the position of said filter so that said filter is at different positions before and after the change in the focal length of said lens unit and changes the direction of moving the position of said filter between when the position is changed to increase the focal length of said lens unit and when the position is changed to reduce the focal length of said lens unit.

9. A control method of an image capturing apparatus, the image capturing apparatus comprising: a lens unit that has a plurality of lenses, the lens unit being capable of changing a focal length by moving at least one of the plurality of lenses; a diaphragm that is disposed between the plurality of lenses included in said lens unit; an imaging unit that outputs an image signal according to light incident through said lens unit; and a filter that adjusts a quantity of light which has passed through the one of the plurality of lenses to change the focal length and is capable of moving in a direction of insertion to an optical path of the light toward said imaging unit and in a direction of retraction from the optical path, the control method comprising:
  a control step of controlling an aperture diameter of said diaphragm and a position of said filter in conjunction with the change in the focal length of said lens unit so as to maintain a quantity of light incident on said imaging unit before and after the change in focal length,
  wherein said control step changes the aperture diameter of said diaphragm so that the aperture diameters are different before and after the change in the focal length of said lens unit, and controls the position of said filter to suppress a change in the quantity of light incident on said image unit caused by the change in the aperture diameter of said diaphragm.

10. A control method of an image capturing apparatus, the image capturing apparatus comprising: a lens unit that has a plurality of lenses, the lens unit being capable of changing a focal length by moving at least one of the plurality of lenses; a diaphragm that is disposed between the plurality of lenses included in said lens unit; an imaging unit that outputs an image signal according to light incident through said lens unit; and a filter that adjusts a quantity of light which has passed through the one of the plurality of lenses to change the focal length and is capable of moving in a direction of insertion to an optical path of the light toward said imaging unit and in a direction of retraction from the optical path, the control method comprising:
  a control step of controlling an aperture diameter of said diaphragm and a position of said filter,
  wherein, when the focal length of said lens unit is changed, the control unit controls the aperture diameter of said diaphragm and the position of said filter based on information related to a changed focal length of said lens unit,
  wherein said control unit changes the aperture diameter of said diaphragm so that the aperture diameters are different before and after the change in the focal length of said lens unit, and controls the position of said filter according to a change in the aperture diameter of said diaphragm, and
  wherein said control unit changes the direction of moving the position of said filter along with the change in the focal length of said lens unit according to the position of said filter before the change in the focal length of said lens unit.

11. A control method of an image capturing apparatus, the image capturing apparatus comprising: a lens unit that has a plurality of lenses, the lens unit being capable of changing a focal length by moving at least one of the plurality of lenses; a diaphragm that is disposed between the plurality of lenses included in said lens unit; an imaging unit that outputs an image signal according to light incident through said lens unit; and a filter that adjusts a quantity of light which has passed through the one of the plurality of lenses to change the focal length and is capable of moving in a direction of insertion to an optical path of the light toward said imaging unit and in a direction of retraction from the optical path, the control method comprising:
  a control step of controlling an aperture diameter of said diaphragm and a position of said filter,
  wherein, when the focal length of said lens unit is changed, the control unit controls the aperture diameter of said diaphragm and the position of said filter based on information related to a changed focal length of said lens unit,
  wherein said control unit changes the aperture diameter of said diaphragm so that the aperture diameters are different before and after the change in the focal length of said lens unit, and controls the position of said filter according to a change in the aperture diameter of said diaphragm, and
  wherein said control unit changes the position of said filter so that said filter is at different positions before and after the change in the focal length of said lens unit and changes the direction of moving the position of said filter between when the position is changed to increase the focal length of said lens unit and when the position is changed to reduce the focal length of said lens unit.

12. A control method of an image capturing apparatus, the image capturing apparatus comprising: a lens unit that has a plurality of lenses, the lens unit being capable of changing a focal length by moving at least one of the plurality of lenses; a diaphragm that is disposed between the plurality of lenses included in said lens unit; an imaging unit that outputs an image signal according to light incident through said lens unit; and a filter that adjusts a quantity of light which has passed through the one of the plurality of lenses to change the focal length and is capable of moving in a direction of insertion to an optical path of the light toward said imaging unit and in a direction of retraction from the optical path, the control method comprising:
  a control step of controlling an aperture diameter of said diaphragm and a position of said filter,
  wherein, when the focal length of said lens unit is changed, the control unit controls the aperture diameter of said diaphragm and the position of said filter based on information related to a changed focal length of said lens unit,
  wherein said control unit changes the aperture diameter of said diaphragm so that the aperture diameters are different before and after the change in the focal length of said lens unit, and controls the position of said filter according to a change in the aperture diameter of said diaphragm,
  wherein said control unit controls the position of said filter to suppress a change in a quantity of light incident on said imaging unit before and after the change in the focal length of said lens unit, and
  wherein said control unit changes the aperture diameter of said diaphragm so that the aperture diameters are different before and after the change in the focal length of said lens unit, and controls the position of said filter to suppress a change in the quantity of light incident on said image unit caused by the change in the aperture diameter of said diaphragm.

* * * * *